(12) United States Patent
Wang et al.

(10) Patent No.: US 12,415,896 B2
(45) Date of Patent: Sep. 16, 2025

(54) BLOWN FILMS WITH IMPROVED PROPERTY PROFILE

(71) Applicant: BOREALIS AG, Vienna (AT)

(72) Inventors: Jingbo Wang, Linz (AT); Markus Gahleitner, Linz (AT); Pauli Leskinen, Porvoo (FI); Klaus Bernreitner, Linz (AT)

(73) Assignee: BOREALIS AG, Vienna (AT)

( * ) Notice: Subject to any disclaimer, the term of this patent is extended or adjusted under 35 U.S.C. 154(b) by 489 days.

(21) Appl. No.: 17/997,865

(22) PCT Filed: May 14, 2021

(86) PCT No.: PCT/EP2021/062801
§ 371 (c)(1),
(2) Date: Nov. 3, 2022

(87) PCT Pub. No.: WO2021/233770
PCT Pub. Date: Nov. 25, 2021

(65) Prior Publication Data
US 2023/0174728 A1 Jun. 8, 2023

(30) Foreign Application Priority Data
May 18, 2020 (EP) .................................. 20175209

(51) Int. Cl.
| | | |
|---|---|---|
| C08J 5/18 | (2006.01) |
| B29C 48/00 | (2019.01) |
| B29C 48/08 | (2019.01) |
| B29C 55/28 | (2006.01) |
| B29K 23/00 | (2006.01) |
| B29K 105/00 | (2006.01) |
| C08L 23/14 | (2006.01) |

(52) U.S. Cl.
CPC .............. *C08J 5/18* (2013.01); *C08L 23/14* (2013.01); *B29C 48/0018* (2019.02); *B29C 48/08* (2019.02); *B29C 55/28* (2013.01); *B29K 2023/00* (2013.01); *B29K 2105/0085* (2013.01); *C08J 2323/14* (2013.01); *C08J 2423/08* (2013.01); *C08L 2203/16* (2013.01); *C08L 2205/02* (2013.01)

(58) Field of Classification Search
CPC ..... B29C 48/0018; B29C 48/08; B29C 48/10; B29C 48/32; B29C 48/49; B29C 48/92; B29C 55/28; C08F 210/06; C08L 2205/02; C08L 2205/025; C08L 2205/03; C08L 2205/035; C08L 23/14; C08L 2203/16
See application file for complete search history.

(56) References Cited

U.S. PATENT DOCUMENTS

| | | |
|---|---|---|
| 10,000,594 B2 | 6/2018 | Hlavinka et al. |
| 2011/0177313 A1 | 7/2011 | Chai et al. |

FOREIGN PATENT DOCUMENTS

| | | | |
|---|---|---|---|
| EP | 0887379 B1 | 12/1998 | |
| EP | 0936247 A1 | 8/1999 | |
| EP | 3031849 A1 | 6/2016 | |
| EP | 3031849 B1 | 10/2018 | |
| EP | 3280768 B1 | 12/2018 | |
| RU | 2705056 C2 | 11/2019 | |
| WO | 92/12182 A1 | 7/1992 | |
| WO | 199414856 A1 | 7/1994 | |
| WO | 199512622 A1 | 5/1995 | |
| WO | 99/24478 A1 | 5/1999 | |
| WO | 99/24479 A1 | 5/1999 | |
| WO | 00/68315 A1 | 11/2000 | |
| WO | 200202576 A1 | 1/2002 | |
| WO | 2004/000899 A1 | 12/2003 | |
| WO | 2004/111095 A1 | 12/2004 | |
| WO | 2006/097497 A1 | 9/2006 | |
| WO | 2007116034 A1 | 10/2007 | |
| WO | 2011/076780 A1 | 6/2011 | |
| WO | 2011135004 A2 | 11/2011 | |
| WO | 2012001052 A2 | 1/2012 | |
| WO | 2012084961 A1 | 6/2012 | |
| WO | 2013007650 A1 | 1/2013 | |
| WO | 2015158790 A2 | 10/2015 | |
| WO | 2018122134 A1 | 7/2018 | |
| WO | WO-2020002349 A1 * | 1/2020 | ............. B32B 27/32 |

OTHER PUBLICATIONS

Chinese Application No. 202180032958.7, Office Action dated Apr. 19, 2024.
Russian Office Action dated Apr. 27, 2023.
Extended European Search Report dated Nov. 4, 2020.
Applicant: Borealis AG; "Blown Films with Improved Property Profile"; International Application No. PCT/EP2021/062801; PCT International Search Report and Written Opinion; Authorized Officer: E. Iraegui Retolaza; dated Sep. 21, 2021; 12 pgs.
Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.
Cheng, H. N. "Carbon-13 NMR analysis of ethylene-propylene rubbers." Macromolecules 17.10 (1984): 1950-1955.
Masahiro Kakugo, et al.; 13C NMR Determination of Monomer Sequence Distribution in Ethylene-Propylene Copolymers Prepared with d-TiCl3-Al( C2H5)2 Cl; Macromolecules 1982, 1150-1152.
Resconi, Luigi, et al. "Selectivity in propene polymerization with metallocene catalysts." Chemical Reviews 100.4 (2000): 1253-1346.

(Continued)

*Primary Examiner* — Christopher M Rodd
(74) *Attorney, Agent, or Firm* — Tarolli, Sundheim, Covell &Tummino LLP

(57) ABSTRACT

Blown films based on a blend of a $C_2C_3$ random copolymer and a $C_2$-based plastomer, which combine low scaling initiation temperature (SIT), good optical properties and an improved stiffness/impact balance, and which also show an excellent sterilization behaviour.

14 Claims, No Drawings

(56) References Cited

OTHER PUBLICATIONS

Singh, Gurmeet, Ajay V. Kothari, and Virendra K. Gupta. "Triad sequence determination of ethylene-propylene copolymers—application of quantitative 13C NMR." Polymer Testing 28.5 (2009): 475-479.

Wang, Wen-Jun, and Shiping Zhu. "Structural analysis of ethylene/propylene copolymers synthesized with a constrained geometry catalyst." Macromolecules 33.4 (2000): 1157-1162.

* cited by examiner

BLOWN FILMS WITH IMPROVED PROPERTY PROFILE

The present invention is related to new blown films based on a blend of a $C_2C_3$ random copolymer and a $C_2$-based plastomer, which combine low sealing initiation temperature (SIT), good optical properties and an improved stiffness/impact balance, and which also show an excellent sterilization behaviour.

Polypropylenes succeed more and more to replace polyethylenes in many technical fields as quite often the new generation of polypropylenes have enhanced properties compared to conventional polyethylene materials. This applies also for the field of blown films where polypropylene take advantage of molecular engineering to overcome previous material shortcomings for blown-film production.

The blown films sector constitutes an area of ever-increasing importance in various application segments, such as industry packaging, consumer packaging, bags and sacks, lamination films, barrier films, packaging of food or medical products, agriculture films, hygienic products and products packaging.

Polypropylene is applicable in areas where sealing properties play an important role, like in the food packing industry, especially when a good combination of transparency and mechanical performance is desired.

Heat sealing is the predominant method of manufacturing flexible and semi-rigid packages. An important indication of good sealing performance is inter alia a low sealing initiation temperature (SIT), which is needed to support high speed on packaging machines. Furthermore, it is also desired to have a packaging material of improved impact strength and other mechanical properties such as high tear strength.

Furthermore, it is also desired to have a packaging material with satisfactory optical properties, such as low haze and/or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120 to 130° C. Thus, the material should have a sufficient thermal stability, like a melting temperature higher than the usual steam sterilization temperature of about 120 to 130° C.

Of course, treatment of a polymer under the sterilization conditions outlined above can impair its final properties, especially the optical properties such as transparency.

It is desired to have a packaging material with satisfactory optical properties, such as low haze, having also good mechanical and sealing properties. It frequently turns out that improvement of one of the desired properties is achieved at the expense of at least one of the other properties. Several attempts have been made to solve the above problems.

EP 3280768 claims a polymer composition comprising (a) 65.0-90.0 wt.-% of a propylene copolymer (A) having (1) a melt flow rate $MFR_2$ (230° C.) measured according to ISO1133 in the range of more than 0.8 to 15.0/10 min, (2) a comonomer content in the range of 2.0 to below 12.0 mol.-%, (3) a melting temperature in the range of 125 to below 143° C., (4) a xylene cold soluble fraction (XCS) in the range of 17.0 to 45.0 wt.-%, and (5) a glass transition temperature (Tg) in the range of from higher than −10° C. to 2° C.; and (b) 10.0-35.0 wt.-% of an elastomeric modifier (B), wherein the elastomeric modifier (B) is characterized in that, (i) the difference between the refractive index (RI) determined at 23° C. according to the standard ISO 489: 1999 (E) of the propylene copolymer (A) and the elastomeric modifier (B) is less than 0.015, and (ii) the glass transition temperature (Tg) of the elastomeric modifier (B) is equal to or below −20° C. The composition is converted into cast films.

The XCS of the PP base (a) is rather high, which limits the applicability of the composition, both because of the low stiffness and the risk of migration into the content.

EP 18180768 discloses cast films made of a $C_2C_3$ random copolymer composition comprising (A) 70.0 to 99.9 wt.-% of a $C_2C_3$ random copolymer having (a) an ethylene content in the range of from 2.0 to 4.8 wt.-%; (b) a melt flow rate $MFR_2$ (230° C./2.16 kg) measured according to ISO 1133 in the range of from 4.0 to 12.0 g/10 min; (c) a melting temperature Tm as determined by DSC according to ISO 11357 of from 120 to 135° C.; (d) a xylene cold soluble (XCS) fraction below 10.0 wt.-%; and (B) 0.0 to 30.0 wt.-% of an ethylene-α-olefin plastomer having a density in the range of from 860 to 900 kg/m³ and an $MFR_2$ (190° C./2.16 kg) measured according to ISO 1133 in the range of 0.5 to 50.0 g/10 min and (C) one or more additives in a total amount of from 0.1 up to 5.0 wt.-%, based on the composition, selected from the group comprising slip agents, anti-block agents, UV stabilizers, antistatic agents, alpha-nucleating agents and antioxidants.

EP 3031849 discloses polypropylene mono-layer cast comprising a blend of (a) 85.0 to 98.0 wt.-%, based on the blend, of a Ziegler-Natta catalysed random propylene copolymer, wherein said random propylene copolymer consists of units derived from propylene and ethylene, and (b) 2.0 to 15.0 wt.-%, based on the blend, of an ethylene based plastomer having a density according to ISO 1183 of 0.915 g/cm³ or below and an $MFR_2$ according to ISO 1133 (190° C.; 2.16 kg) in the range of 2.0 to 30 g/10 min, wherein the amounts of a) and b) sum to 100 wt.-%6.

Such compositions based on Ziegler-Natta catalysed random propylene copolymers have, due to the catalyst used, high XCS and low toughness.

Thus, although several cast films are known in the art, there is still the need to develop blown films, which provide an advantageous combination of low sealing initiation temperature, optical properties and mechanical properties, like tensile modulus, impact strength (DDI) and tear resistance.

Accordingly, the object of the present invention is to provide a blown film, especially an unoriented blown film, having excellent sealing properties paired with good optical performance and an improved stiffness/impact balance, especially having high tensile modulus, high impact strength and a high tear resistance.

The present invention is based on the finding that the above discussed needs for heat sealing applications, i.e. simultaneously having low sealing initiation temperature (SIT), improved mechanical properties, especially impact strength and tear strength, and also excellent sterilization behaviour, can be achieved by a specific design of a polyolefin composition.

Thus, according to a first aspect the present invention is directed to blown films comprising at least 95.0 wt.-% of a blend of component (A) and (B), the blend comprising (A) 60.0 wt.-% to 95.0 wt.-% of a $C_2C_3$ random copolymer consisting of 45.0 wt.-% to 85.0 wt.-% of polymer fraction (A-1) having (i) an ethylene content in the range of from 1.5 to 5.0 wt.-% and
(ii) a melt flow rate MFR$_2$ (230° C./2.16 kg) measured according to ISO 1133 in the range of from 0.8 to 8.0 g/10 min and
15.0 wt.-% to 55.0 wt.-% of polymer fraction (A-2) having
(i) an ethylene content in the range of from 4.0 to 10.0 wt-% and
(ii) a melt flow rate MFR$_2$ (230° C./2.16 kg) measured according to ISO 1133 in the range of from 0.1 to 3.0 g/10 min,
whereby the ethylene content of polymer fraction (A-2) is higher than the ethylene content of polymer fraction (A-1), and the melt flow rate MFR$_2$ (230° C./2.16 kg) of polymer fraction (A-2) is lower than the MFR$_2$ (230° C./2.16 kg) of polymer fraction (A-1), and whereby the C$_2$C$_3$ random copolymer has
(a) a total ethylene content in the range of from 1.0 to 7.0 wt.-%;
(b) a melt flow rate MFR$_2$ (230° C./2.16 kg) measured according to ISO 1133 in the range of from 0.5 to less than 4.0 g/10 min and
(c) a melting temperature Tm as determined by DSC according to ISO 11357 of from 110° C. to 140° C.,
wherein said copolymer is prepared using a single site catalyst, and
(B) 5.0 wt.-% to 40.0 wt.-% of an ethylene based plastomer having
(i) a density according to ISO 1183 of 860 kg/m to 900 kg/m$^3$ and
(ii) an MFR$_2$ according to ISO 1133 (190° C.; 2.16 kg) in the range of 0.1 to 50 g/10 min,
(iii) a comonomer selected from C$_4$ to Ca alpha-olefins, said blown film having
a) a dart-drop impact strength (DDI) determined according to ASTM D1709, method A on a 50 µm blown film of at least 60 g up to more than 1700 g and
b) an Elmendorf tear strength determined in accordance with ISO 6383/2 measured in machine direction (MD), in the range from at least 5.0 N/mm up to 50.0 N/mm and measured in transverse direction (TD) in the range of from at least 80.0 N/mm up to 300.0 N/mm.

In the following, the invention is defined in more detail.
The blown films according to the invention comprises a blend of a C$_2$C$_3$ random copolymer (A) and an ethylene based plastomer (B).

Ad C$_2$C$_3$ Random Copolymer (A)

Component (A) can be present in an amount of from 60.0 to 95.0 wt.-%, based on the total weight of the blend, preferably in an amount of from 65.0 to 93.0 wt.-%, more preferably in an amount of 70.0 to 92.0 wt.-%.

The C$_2$C$_3$ random copolymer (A) of the invention is a random copolymer of propylene and ethylene as comonomer.

The C$_2$C$_3$ random copolymer (A) is obtained, in the presence of a metallocene catalyst.

The C$_2$C$_3$ random copolymer (A) according to this invention is featured by a moderate to low ethylene comonomer content.

Accordingly, the C$_2$C$_3$ random copolymer (A) has a total ethylene content in the range of 1.0 to 7.0 wt.-%, preferably 1.5 to 6.5 wt.-%, more preferably 2.0 to 6.0 wt.-% and even more preferably 2.5 to 5.5 wt.-%.

The C$_2$C$_3$ random copolymer (A) has a melt flow rate MFR$_2$ (230° C./2.16 kg) measured according to ISO 1133 in the range of from 0.5 to less than 4.0 g/10 min, preferably 0.7 to 3.5 g/min and more preferably 0.9 to 3.0 g/min.

The C$_2$C$_3$ random copolymer (A) furthermore has a melting temperature Tm measured via DSC according to ISO 11357 in the range of 110° C. to 140° C., preferably 115° C. to 135° C., more preferably 118° C. to 132° C.

Alternatively, the C$_2$C$_3$ random copolymer (A) can be defined by the xylene cold soluble (XCS) content determined at 25° C. according ISO 16152; 2005. Accordingly, the C$_2$C$_3$ random copolymer (A) is preferably featured by a xylene cold soluble (XCS) content of from 0.6 wt.-% to 12.0 wt.-%, preferably in the range of from 1.0 to 10.0 wt.-%, more preferably in the range from 1.5 to 8.0 wt.-% and even more preferably in the range from 2.0 to 6.0 wt.-%.

The C$_2$C$_3$ random copolymer (A) is bimodal in view of the comonomer content and the MFR$_2$ and consists of polymer fractions (A-1) and (A-2).

Thus, the C$_2$C$_3$ random copolymer (A) comprises 45.0 to 85.0 wt.-% of polymer fraction (A-1) having
(i) an ethylene content in the range of from 1.5 to 5.0 wt.-% and
(ii) a melt flow rate MFR$_2$ (230° C./2.16 kg) measured according to ISO 1133 in the range of from 0.8 to 8.0 g/10 min and
15.0 to 55.0 wt.-% of polymer fraction (A-2) having
(i) an ethylene content in the range of from 4.0 to 10.0 wt-% and
(ii) a melt flow rate MFR$_2$ (230° C./2.16 kg) measured according to ISO 1133 in the range of from 0.1 to 3.0 g/10 min,
whereby the ethylene content of polymer fraction (A-2) is higher than the ethylene content of polymer fraction (A-1), and the melt flow rate MFR$_2$ (230° C./2.16 kg) of polymer fraction (A-2) is lower than the MFR$_2$ (230° C./2.16 kg) of polymer fraction (A-1).

Preferably, the C$_2$C$_3$ random copolymer (A) comprises 50.0 to 80.0 wt.-% of polymer fraction (A-1) and 20.0 to 50.0 wt.-% of polymer fraction (A-2).

More preferably, the C$_2$C$_3$ random copolymer (A) comprises 55.0 to 75.0 wt.-% of polymer fraction (A-1) and 25.0 to 45.0 wt.-% of polymer fraction (A-2).

Polymer fraction (A-1) preferably has an ethylene content in the range of from 1.8 to 4.5 wt.-% and more preferably in the range of from 2.0 to 4.0 wt.-%.

The melt flow rate MFR$_2$ (230° C./2.16 kg) measured according to ISO 1133 of polymer fraction (A-1) is preferably in the range of from 1.0 to 6.5 g/10 min, more preferably in the range of from 2.0 to 5.0 g/10 min.

Polymer fraction (A-2) preferably has an ethylene content in the range of from 4.5 to 9.0 wt.-% and more preferably in the range of from 4.7 to 8.0 wt.-%.

The melt flow rate MFR$_2$ (230° C./2.16 kg) measured according to ISO 1133 of polymer fraction (A-2) is preferably in the range of from 0.2 to 2.5 g/10 min and more preferably in the range of from 0.2 to 2.0 g/10 min, like 0.2 to 1.8 g/10 min.

The C$_2$C$_3$ random copolymer (A) is therefore preferably prepared by polymerizing propylene and ethylene by a sequential polymerization process comprising at least two reactors connected in series in the presence of a metallocene catalyst.

Thus, the C$_2$C$_3$ random copolymer (A) is prepared in a sequential polymerization process comprising at least two polymerization reactors (R1) and (R2), whereby in the first polymerization reactor (R1) a first polymer fraction (A-1) is produced, which is subsequently transferred into the second polymerization reactor (R2). In the second polymerization reactor (R2), a second polymer fraction (A-2) is then produced in the presence of the first polymer fraction (A-1).

Polymerization processes which are suitable for producing the $C_2C_3$ random copolymer (A) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the $C_2C_3$ random copolymer (A) is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by *Borealis* (known as BORSTAR® technology) described e.g. in patent literature, such as in EP 0 887 379, WO 92/12182, WNO 2004/000899, WNO 2004/111095, WNO 99/24478, WO 99/24479 or in WO 00/68315.

A further suitable slurry-gas phase process is the Spheripol® process of Basell.

Preferably, in the instant process for producing the $C_2C_3$ random copolymer composition as defined above the conditions for the first reactor (R1), i.e. the slurry reactor (SR), like a loop reactor (LR), of step (a) may be as follows:
the temperature is within the range of 40° C. to 110° C., preferably between 60° C. and 100° C., more preferably between 65° C. and 95° C.,
the pressure is within the range of 20 bar to 80 bar, preferably between 40 bar to 70 bar, hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The $C_2C_3$ random copolymer (A) according to this invention is produced in the presence of a metallocene catalyst.

Thus, the $C_2C_3$ random copolymer (A) is produced by a process comprising the following steps:
a) polymerizing in a first reactor (R1) propylene and ethylene, obtaining polymer fraction (A-1) of the $C_2C_3$ random copolymer (A),
b) transferring said polymer fraction (A-1) and unreacted comonomers of the first reactor in a second reactor (R2),
c) feeding to said second reactor (R2) propylene and ethylene,
d) polymerizing in said second reactor (R2) and in the presence of said polymer fraction (A-1) propylene and ethylene obtaining polymer fraction (A-2),
said polymer fraction (A-1) and said polymer fraction (A-2) form the $C_2C_3$ random copolymer (A) as defined above, whereby the polymerization takes place in the presence of a metallocene catalyst comprising (i) a complex of formula (I):

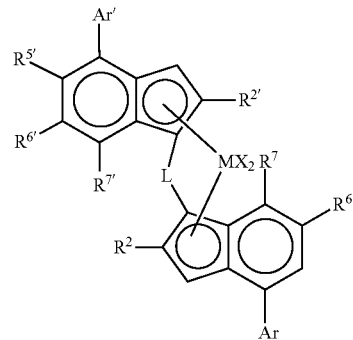

wherein M is zirconium or hafnium; each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_m$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$-hydrocarbyl radical optionally containing one or more heteroatoms from groups 14-16 of the periodic table;
$R^{5'}$ is a $C_{1-20}$-hydrocarbyl group containing one or more heteroatoms from groups 14-16 of the periodic table optionally substituted by one or more halo atoms;
$R^6$ and $R^{6'}$ are each independently hydrogen or a $C_{1-20}$-hydrocarbyl group optionally containing one or more heteroatoms from groups 14-16 of the periodic table; wherein $R^{6'}$ is preferably a tertiary alkyl group;
$R^7$ is hydrogen or $C_{1-20}$-hydrocarbyl group optionally containing one or more heteroatoms from groups 14-16 and $R^{7'}$ is hydrogen;
Ar and Ar' are each independently an aryl or heteroaryl group having up to 20 carbon atoms optionally substituted by one or more groups $R^1$;
each $R^1$ is a $C_{1-20}$-hydrocarbyl group or two $R^1$ groups on adjacent carbon atoms taken together can form a fused 5 or 6 membered non aromatic ring with the Ar or Ar' group, said ring being itself optionally substituted with one or more groups $R^4$; each $R^4$ is a $C_{1-20}$-hydrocarbyl group; and (ii) a cocatalyst comprising at least one or two compounds of a group 13 metal of the periodic table, e.g. Al and/or boron compound.

More preferably, a cocatalyst system comprising a boron containing cocatalyst, like borate cocatalyst and an aluminoxane cocatalyst is used.

Even more preferably, the catalyst is supported on a silica support.

Ad Catalyst:

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 µm. However, it has turned out that special advantages can be obtained if the support has an average particle size from 15 to 80 µm, preferably from 18 to 50 µm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes of use in the invention are of formula (II') or (II)

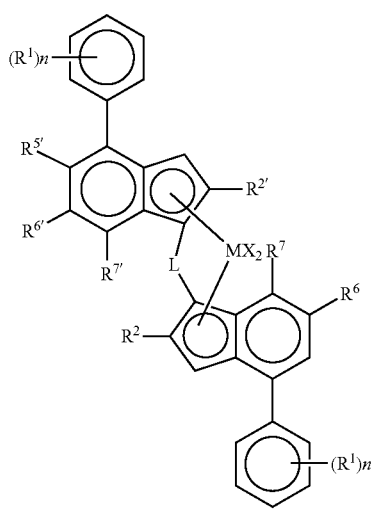

(II')

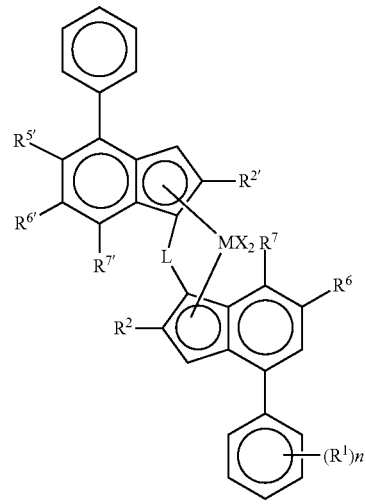

(II)

wherein M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$-alkyl, $C_{3-10}$-cycloalkyl, tri($C_{1-20}$-alkyl)silyl, $C_{6-20}$-aryl, $C_{7-20}$-arylalkyl or $C_{7-20}$-alkylaryl;

each of $R^2$ or $R^{2'}$ is a $C_{1-10}$-alkyl group;

$R^{5'}$ is a $C_{1-10}$ alkyl group or Z'$R^{3'}$ group;

$R^6$ is hydrogen or a $C_{1-10}$-alkyl group;

$R^{6'}$ is a $C_{1-10}$-alkyl group or $C_{6-10}$-aryl group; preferably a tertiary alkyl group;

$R^7$ is hydrogen, a $C_{1-6}$-alkyl group or $ZR^3$ group and $R^{7'}$ is hydrogen;

Z and Z are independently O or S;

$R^{3'}$ is a $C_{1-10}$-alkyl group, or a $C_{6-10}$-aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$-hydrocarbyl group, e.g. $C_{1-10}$-alkyl group.

Further preferred complexes of use in the invention are of formula (III') or (III):

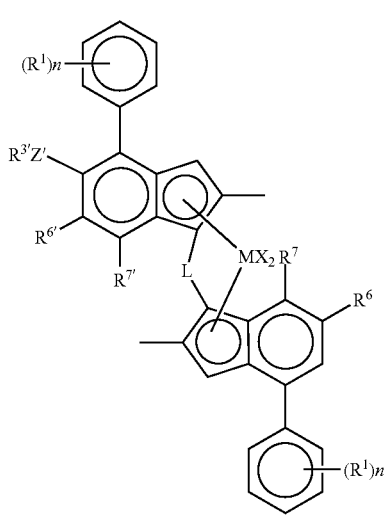

(III')

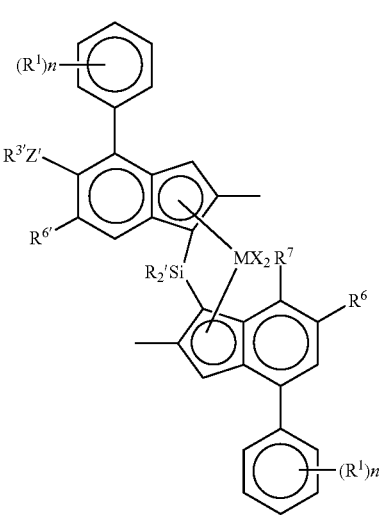

(IV')

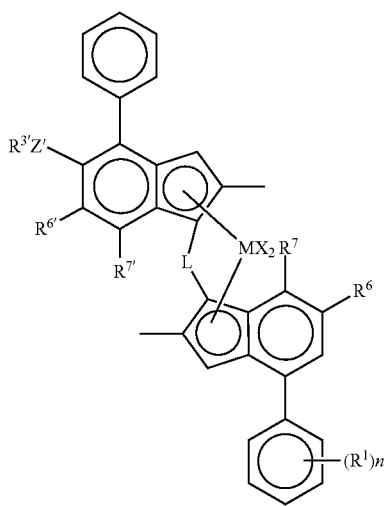

(III)

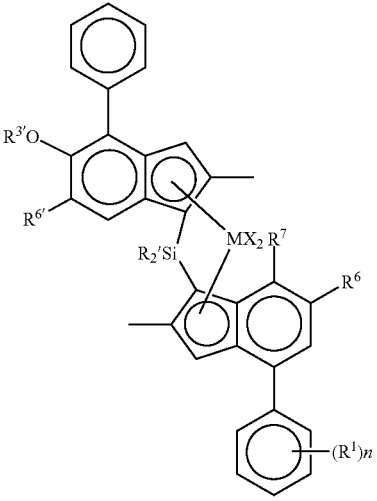

(IV)

M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C— or —R'$_2$Si— wherein each R' is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z' is O or S;

$R^{3'}$ is a $C_{1-10}$-alkyl group, or $C_{6-10}$-aryl group optionally substituted by one or more halo groups;

n is independently 0 to 4, e.g. 0, 1 or 2; and each $R^1$ is independently a $C_{1-10}$-alkyl group.

Further preferred complexes of use in the invention are of formula (IV') or (IV):

M is zirconium or hafnium;

each X is independently a hydrogen atom, a halogen atom, $C_{1-6}$-alkoxy group, $C_{1-6}$-alkyl, phenyl or benzyl group;

each R' is independently a hydrogen atom, $C_{1-20}$-alkyl or $C_{3-7}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z' is O or S;

$R^{3'}$ is a $C_{1-10}$-alkyl group, or $C_{6-10}$-aryl group optionally substituted by one or more halo groups;

n is independently 0 to 2; and each $R^1$ is independently a $C_{3-8}$-alkyl group.

Most preferably, the complex of use in the invention is of formula (V') or (V):

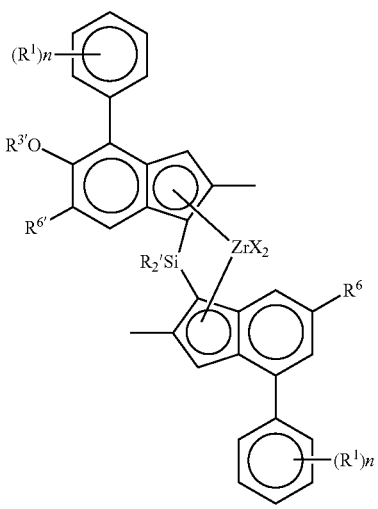

(V')

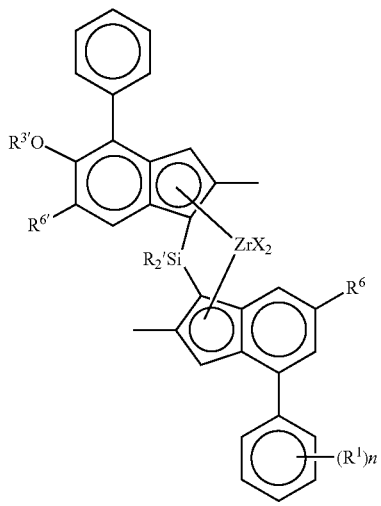

(V)

wherein each X is independently a hydrogen atom, a halogen atom, $C_{1-6}$-alkoxy group, $C_{1-6}$-alkyl, phenyl or benzyl group;
R' is independently a $C_{1-6}$-alkyl or $C_{3-10}$-cycloalkyl;
$R^1$ is independently $C_{3-8}$-alkyl;
$R^6$ is hydrogen or a $C_{3-8}$-alkyl group;
$R^{6'}$ is a $C_{3-8}$-alkyl group or $C_{6-10}$-aryl group, preferably a tertiary $C_{4-8}$-alkyl group;
$R^{3'}$ is a $C_{1-6}$-alkyl group, or $C_{6-10}$-aryl group optionally substituted by one or more halo groups;
and n is independently 0, 1 or 2.
Particular compounds of the invention include:
rac-anti-Me2Si(2-Me-4-Ph-6-tBu-Ind)(2-Me-4-Ph-5-OMe-6-tBu-Ind)ZrCl2,
rac-anti-Me2Si(2-Me-4-(p-tBuPh)-Ind)(2-Me-4-Ph-5-OMe-6-tBu-Ind)ZrCl2
rac-anti-Me2Si(2-Me-4-(3,5-di-tBuPh)-6-tBu-Ind)(2-Me-4-Ph-5-OMe-6-tBu-Ind)ZrC12
rac-anti-Me2Si(2-Me-4-Ph-6-tBu-Ind)(2-Me-4,6-di-Ph-5-OMe-Ind)ZrCl2
rac-anti-Me2Si(2-Me-4-(p-tBuPh)-Ind)(2-Me-4-Ph-5-OC6F5)-6-iPr-Ind)ZrCl2
rac-anti-Me(CyHex)Si(2-Me-4-Ph-6-tBu-Ind)(2-Me-4-Ph-5-OMe-6-tBu-Ind)ZrCl2
rac-anti-Me2Si(2-Me-4-(3,5-di-tBuPh)-7-Me-Ind)(2-Me-4-Ph-5-OMe-6-tBu-Ind)ZrCl2
rac-anti-Me2Si(2-Me-4-(3,5-di-tBuPh)-7-OMe-Ind)(2-Me-4-Ph-5-OMe-6-tBu-Ind)ZrCl2
rac-anti-Me2Si(2-Me-4-(p-tBuPh)-6-tBu-Ind)(2-Me-4-Ph-5-OMe-6-tBu-Ind)ZrCl2
rac-anti-Me2Si(2-Me-4-(p-tBuPh)-Ind)(2-Me-4-(4-tBuPh)-5-OMe-6-tBu-Ind)ZrCl2
rac-anti-Me2Si(2-Me-4-(p-tBuPh)-Ind)(2-Me-4-(3,5-tBu2Ph)-5-OMe-6-tBu-Ind)ZrCl2
rac-anti-Me2Si(2-Me-4-(p-tBuPh)-Ind)(2-Me-4-Ph-5-OiBu-6-tBu-Ind)ZrCl2

Most preferably rac-anti-Me2Si(2-Me-4-(p-tBuPh)-Ind)(2-Me-4-Ph-5-OMe-6-tBu-Ind)ZrCl2 is used.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (VI):

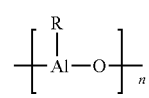

(VI)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (VI).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (VII)

$$BY_3 \quad (VII)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl) phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3, 5-difluorophenyl)borane and/or tris(3,4,5-trifluorophenyl)borane.

Particular preference is given to tris(pentafluorophenyl) borane.

However, it is preferred that as a boron containing cocatalyst borates are used, i.e. compounds containing a borate.

These compounds generally contain an anion of formula:

$$(Z)_4B^- \quad (VIII)$$

where Z is an optionally substituted phenyl derivative, said substituent being a halo-$Cw_4$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include:
tributylammoniumtetra(pentafluorophenyl)borate,
tributylammoniumtetra(trifluoromethylphenyl)borate,
tributylammoniumtetra(4-fluorophenyl)borate,
N, N-dimethylcyclohexylammoniumtetrakis(pentafluorophenyl)borate,
N,N-dimethylbenzylammoniumtetrakis(pentafluorophenyl)borate,
N, N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylaniliniumtetrakis(pentafluorophenyl)borate,
N,N-dimethylcyclohexylammoniumtetrakis(pentafluorophenyl)borate or
N,N-dimethylbenzylammoniumtetrakis(pentafluorophenyl)borate According to the present invention, it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

The inventive $C_2C_3$ random copolymer (A) can optionally comprise one or more additives in a total amount of from 0.1 up to 5.0 wt %, based on based on the overall weight of the copolymer (A), selected from the group comprising slip agents, anti-block agents, UV stabilizers, antistatic agents, alpha-nucleating agents and antioxidants.

Such additives are commonly known to an art skilled person.

Usually such additives are added in quantities of 100-1.000 ppm for each single component.

Preferably, at least an antioxidant is added.

Ad Ethylene Based Plastomer (B)

The blend for the blown film further comprises component (B), which is an ethylene based plastomer.

Component (B) can be present in an amount of from 5.0 to 40.0 wt.-%, based on the total weight of the blend, preferably in an amount of from 7.0 to 35.0 wt.-%, more preferably in an amount of from 8.0 to 30.0 wt.-%.

The ethylene based plastomer has a density according to ISO 1183 in the range of from 860 to 900 $kg/m^3$, preferably in the range of from 865 to 895 $kg/m^3$, more preferably in the range of from 870 to 890 $kg/m^3$ and even more preferably in the range of from 875 to 890 $kg/m^3$. The $MFR_2$ (190° C./2.16 kg) measured according to ISO 1133 of the ethylene based plastomer is in the range of from 0.1 to 50.0 g/10 min, preferably in the range of from 0.3 to 20.0 g/10 min, more preferably in the range of from 0.5 to 10.0 g/10 min and more preferably in the range of from 0.8 to 5.0 g/10 min.

Suitable ethylene-based plastomers may have an ethylene content from 60.0 to 95.0 wt.-%, preferably from 65.0 to 90.0 wt.-% and more preferably from 70.0 to 88.0 wt.-%. The comonomer contribution preferably is up to 40.0 wt.-%, more preferably up to 35.0 wt.-%. The comonomer contents of conventional ethylene plastomers are familiar to the person skilled in the art.

The ethylene based plastomer is a copolymer of ethylene and a $C_4$-$C_8$ alpha-olefin. Suitable $C_4$-$C_8$ alpha-olefins include 1-butene, 1-hexene and 1-octene, preferably 1-butene or 1-octene and more preferably 1-octene. Preferably, copolymers of ethylene and 1-octene are used.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is from 33 to 115° C.

Furthermore suitable ethylene based plastomers may have a glass transition temperature Tg (measured by DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of from 1.5 to 5.0, more preferably in the range of from 2.0 to 4.5, even more preferably in the range of from 2.5 to 4.0.

The ethylene based plastomer can be unimodal or multimodal, preferably unimodal.

Preferably, the PE plastomer is a metallocene catalysed polymer although Ziegler-Natta based polyethylene plastomers are also possible.

Suitable ethylene based plastomers can be any copolymer of ethylene and $C_4$-$C_8$ alpha olefin having the above defined properties, which are commercial available, i.a. from Borealis AG (AT) under the tradename Queo, from DOW Chemical Corp (USA) under the tradename Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably, these ethylene based plastomers are prepared by a one stage or two stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. Preferably, the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by a $C_{1-4}$ alkyl group such as pentane, methyl pentane, hexane, heptane, octane, cyclohexane, methylcyclohexane and hydrogenated naphtha. More preferably, unsubstituted $C_6$-10-hydrocarbon solvents are used.

A known solution technology suitable for the process according to the invention is the Borceed technology.

It will be appreciated, that the ethylene based plastomer may contain standard polymer additives.

The Blown Film

The present invention is related to a blown film comprising at least 95.0 wt-%, more preferably at least 98.0 wt.-% and even more preferably at least 99.0 wt.-% of the above described blend of Component (A) and (B).

Moreover, the blown films of the invention preferably consist of the blend as the sole polymer component. However, it is to be understood herein, that the films may comprise further components such as additives, which may optionally be added in a mixture with a carrier polymer, i.e. in a so-called master batch.

The films of the invention may be multilayer or mono-layer films, but are preferably monolayer films.

Mono-layer films having a thickness of 5 to 300 μm, preferably 10 to 200 μm, more preferably 20 to 150 μm are suitable according to the present invention.

Blown films according to the invention have a dart-drop impact strength (DDI) determined according to ASTM D1709, method A on a 50 μm blown film of at least 60 g up to more than 1700 g, preferably in the range of 80 g up to more than 1700 g, and more preferably in the range of 100 g up to more than 1700 g. The upper limit of more than 1700 g is due to the upper detection limit of 1700 g of the method.

Blown films according to the invention have in addition a high Elmendorf tear strength as determined in accordance with ISO 6383/2. As measured in machine direction (MD), the tear strength is in the range from at least 5.0 N/mm up to 50.0 N/mm, preferably in the range of 7.0 up to 45.0 N/mm, and more preferably in the range of 7.5 to 40.0 N/mm.

As measured in transverse direction (TD), the tear strength is in the range of from at least 80.0 N/mm up to 300.0 N/mm, preferably in the range of 90.0 to 250.0 N/mm, and more preferably in the range of 100.0 to 200.0 N/mm.

The tensile modulus of the blown film itself shall be moderate. Thus, the tensile modulus of the blown film based on the blend of Component (A) and (B) shall be less than 800 MPa, more preferably less than 750 MPa.

The tensile modulus determined according to ISO 527 at 23° C. on blown films with a thickness of 50 μm in machine direction as well as in transverse direction is therefore in the range of from 200 to less than 800 MPa, preferably of from 250 to 750 MPa, more preferably of from 300 to 600 MPa.

Films of the invention preferably have a sealing initiation temperature (SIT) (determined on 50 μm blown film as described in the experimental part) in the range of from 80° C. to below 115° C., preferably 85° C. to 112° C., more preferably 87° C. to 108° C.

The films can furthermore have a haze (determined according to ASTM D 1003-00 on 50 μm blown film) in the range of from 0.5 to below 5.0%, preferably 0.8 to below 4.5%, more preferably 1.0 to below 4.0%, and a clarity (determined according to ASTM D1003-00 on blown film with a thickness of 50 μm) of at least 80.0% up to 100.0%, preferably at least 85.0% up to 100.0%, more preferably at least 90.0% up to 100.0%.

Blown films of the present invention have sufficient thermal stability to enable sterilization treatment.

Such films can be subjected to a steam sterilization treatment in a temperature range of about 120° C. to 130° C. with a duration of 15 to 45 minutes, without destroying the good optical properties.

Thus, blown films according to the invention have a haze value (determined according to ASTM D 1003-00 on 50 μm blown film) after steam sterilization at 121° C. for 30 min in the range of 1.0 to below 10.0%, preferably in the range of 1.2 to below 8.0%, and more preferably in the range of 1.5 to below 7.5% and a clarity (determined according to ASTM D1003-00 on blown films with a thickness of 50 μm) after sterilization (steam sterilization at 121° C. for 30 min) of at least 70.0%, preferably of at least 75.0% and more preferably of at least 80.0%, up to 100%.

Viewed from another aspect, it is a constant need to provide films, which not only show improvements in one or two of these mechanical or optical properties. So it is desired to provide products with a well-balanced and continuously improved overall performance.

Such an improvement in the overall performance of a blown film can be expressed by the optomechanical ability.

In view of the present invention, optomechanical ability (OMA) is understood as the ratio of mechanical (especially tear strength (MD) and tensile (MD)) behaviour, to optical performance, namely haze, wherein the mechanical properties are targeted to be as high as possible and the optical performance in the sense of haze is desired to be as low as possible.

The optomechanical ability can be determined by multiplying Tensile Modulus (MD) and tear strength (MD) (Tear) and putting this product in relation to haze (before sterilization) determined on 50 μm blown film.

The optomechanical ability (OMA) is therefore determined according the formula given below:

$$OMA = \frac{\text{Tensile Modulus}(MD)[\text{MPa}] * \text{Tear }(MD)[\text{N/mm}]}{\text{Haze (50 μm)}[\%]}$$

Thus in one further embodiment of the present invention, the optomechanical ability (OMA) of films determined on 50 μm blown film is at least 900 [MPa*N/mm*%] up to 4000 [MPa*N/mm*%], preferably in the range of from 1000 [MPa*N/mm*%] up to 3000 [MPa*N/mm*%].

It will be appreciated that any parameter mentioned above is measured according to the detailed test given below. In any parameter where a narrower and broader embodiment are disclosed, those embodiments are disclosed in connection with the narrower and broader embodiments of other parameters.

For manufacturing the blown film, a melt of the blend of Component (A) and (B) is extruded through an annular die and blown into a tubular film.

Thus, the present invention is related to the manufacture of the inventive blown film by extrusion of the blend of Component (A) and (B) as defined herein by conventional blown film extrusion, i.e. the blend of Component (A) and (B) is extruded through a die, preferably circular die, followed by forming a bubble which is collapsed between nip rollers after solidification. The blown extrusion can preferably be effected at a temperature in the range 160 to 240° C., whereby cooling by water or preferably by blowing gas (generally air) is done at a temperature of 10 to 50° C. to provide a frost line height of 0.5 to 8 times the diameter of the die. The blow up ratio should generally be in the range of from 1.5 to 4, such as in the range of from 2 to 4 and preferably in the range of from 2.5 to 3.5.

Furthermore, the present invention is also directed to the use of the inventive blown film, as packaging material, in particular as a packaging material for food and/or medical products. Alternatively, the present invention is also directed to the use of the inventive blown film as sealing layer in a multi-layer film.

In addition, the present invention is related to articles comprising a blown film as defined herein.

The invention will now be described with reference to the following non-limiting examples.

EXPERIMENTAL PART

A. Measuring Methods

The following definitions of terms and determination methods apply for the above general description of the invention as well as to the below examples unless otherwise defined.

Melt Flow Rate

The melt flow rate (MFR) was determined according to ISO 1133—Determination of the melt mass-flow rate (MFR) and melt volume-flow rate (MVR) of thermoplastics—Part 1: Standard method and is indicated in g/10 min. The MFR is an indication of the flowability, and hence the processability, of the polymer. The higher the melt flow rate, the lower the viscosity of the polymer. The $MFR_2$ of polyethylene is determined at a temperature of 190° C. and a load of 2.16 kg. The $MFR_2$ of polypropylene is determined at a temperature of 230° C. and a load of 2.16 kg.

Calculation of melt flow rate $MFR_2$ (230° C.) of the polymer fraction (A-2):

$$MFR(A2) = 10\left[\frac{\log(MFR(A)) - w(A1) \times \log(MFR(A1))}{w(A2)}\right]$$

wherein w(A1) is the weight fraction [n wt %] of the polymer fraction A-1 w(A2) is the weight fraction [in wt %] of the polymer fraction A-2,

MFR(A1) is the melt flow rate $MFR_2$ (230° C.) [in g/10 min] of the polymer fraction A-1, MFR(A) is the melt flow rate $MFR_2$ (230° C.) [n g/10 min] of the $C_2C_3$ random copolymer (A), MFR(A2) is the calculated melt flow rate $MFR_2$ (230° C.) [g/10 min] of the polymer fraction A-2.

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of Comonomer Content of the Second Polymer Fraction (A-2):

$$\frac{C(A)-w(A1)\times C(A1)}{w(A2)}=C(A2) \quad (I)$$

Wherein
w(A-1) is the weight fraction [in wt.-%] of the first polymer fraction (A-1),
w(A-2) is the weight fraction [in wt.-%] of second polymer fraction (A-2),
C(A-1) is the comonomer content [in wt-%] of the first polymer fraction (A-1),
C(A) is the comonomer content [in wt.-%] of the $C_2C_3$ random copolymer (A),
C(A-2) is the calculated comonomer content [in wt-%] of the second polymer fraction (A-2).

Xylene Cold Solubles (XCS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=(100*m*$V_0$)/($m_0$*v); $m_0$=initial polymer amount (g); m=weight of residue (g); $V_0$=initial volume (ml); v=volume of analysed sample (ml).

Melting Temperature $T_m$ and Crystallization Temperature $T_c$

The parameters are determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while the melting temperature ($T_m$) is determined from the second heating step. Melting and crystallization temperatures were taken as the peaks of endotherms and exotherms.

Sealing Initiation Temperature (SIT); (Sealing End Temperature (SET), Sealing Range)

The method determines the sealing temperature range (sealing range) of polypropylene films, in particular blown films. The sealing temperature range is the temperature range, in which the films can be sealed according to conditions given below. The lower limit (heat sealing initiation temperature (SIT)) is the sealing temperature at which a sealing strength of 5+/−0.5 N is achieved. The upper limit (sealing end temperature (SET)) is reached, when the films stick to the sealing device.

The sealing range was determined on a J&B Universal Sealing Machine Type 3000 of the multilayer films as produced indicated below with the following parameters:
Specimen width: 25.4 mm
Seal Pressure: 0.1 N/mm$^2$
Seal Time: 0.1 sec
Cool time: 99 sec
Peel Speed: 10 mm/sec
Start temperature 80° C.
End temperature: 150° C.
Increments: 10° C.
specimen is sealed A to A at each seal bar temperature and seal strength (force) is determined at each step. The temperature is determined at which the seal strength reaches 5 N.

Flexural Modulus

The flexural modulus was determined in 3-point-bending according to ISO 178 on 80×10×4 mm$^3$ test bars injection moulded at 23° C. in line with EN ISO 1873-2.

Tear resistance (determined as Elmendorf tear (N)): Applies both for the measurement in machine direction (MD) and transverse direction (TD). The tear strength is measured using the ISO 6383/2 method. The force required to propagate tearing across a film sample is measured using a pendulum device. The pendulum swings under gravity through an arc, tearing the specimen from pre-cut slit. The film sample is fixed on one side by the pendulum and on the other side by a stationary clamp. The tear resistance is the force required to tear the specimen. The relative tear resistance (N/mm) is then calculated by dividing the tear resistance by the thickness of the film.

Tensile Modulus

Tensile modulus in machine and transverse direction were determined according to ISO 527-3 at 23° C. on the films as produced indicated below. Testing was performed at a cross head speed of 1 mm/min.

Dart Drop Strength (DDI)

Dart-drop was measured using ASTM D1709, method A (Alternative Testing Technique) from the films as produced indicated below. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Haze and Clarity

Haze and clarity were determined according to ASTM D 1003-00 on films as produced indicated below.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

B. Examples $C_2C_3$ Random Copolymer (Component A)

The catalyst used in the polymerization processes for the $C_2C_3$ random copolymer of the inventive examples (IE1, IE2) and (CE1) was prepared as follows:

The metallocene ($MC_1$) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

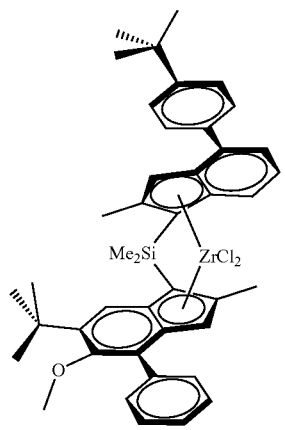

has been synthesized according to the procedure as described in WO2013007650, E2.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32 kg) was added. The mixture was stirred for 15 min. Next 30 wt.-% solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated $SiO_2$ was dried at 60° C. under nitrogen flow for 2 hours and then for 5 hours under vacuum (−0.5 barg) with stirring. MAO treated support was collected as a free-flowing white powder found to contain 12.6% Al by weight.

Catalyst System Preparation 30 wt.-% MAO in toluene (2.2 kg) was added into a steel nitrogen blanked reactor via a burette at 20° C. Toluene (7 kg) was then added under stirring. Metallocene $MC_1$ (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt-% Al and 0.26 wt.-% Zr The polymerization for preparing the inventive $C_2C_3$ random copolymer (PRC) was performed in a Borstar pilot plant with a 2-reactor set-up (loop—gas phase reactor (GPR 1)). In Table 1 the polymerization conditions are given.

TABLE 1

| | Component (A) |
|---|---|
| Prepoly reactor | |
| Temperature [° C.] | 25 |
| Pressure [Pa] | 5149 |
| Catalyst feed [g/h] | 2.0 |
| $C_3$ feed [kg/h] | 52 |
| $H_2$ feed [g/h] | 0.3 |
| Residence time [h] | 0.4 |
| loop reactor | |
| Temperature [° C.] | 68 |
| Pressure [Pa] | 5385 |
| Feed $H_2/C_3$ ratio [mol/kmol] | 0.24 |
| Feed $C_2/C_3$ ratio [mol/kmol] | 48.3 |
| Polymer Split [wt.-%] | 67 |
| $MFR_2$ [g/10 min] (MFR of A-1) | 2.0 |
| Total $C_2$ loop [wt.-%] (C2 of A-1) | 3.7 |
| XCS loop [wt.-%] | 3.5 |
| Residence time (h) | 0.4 |
| GPR1 | |
| Temperature [° C.] | 75 |
| Pressure [Pa] | 2500 |
| $H_2/C_3$ ratio [mol/kmol] | 2.0 |
| $C_2/C_3$ ratio [mol/kmol] | 224 |
| Polymer residence time (h) | 1.8 |
| Polymer Split [wt.-%] | 33 |
| Total $MFR_2$ [g/10 min] | 1.1 |
| $MFR_2$ [g/10 min] in GPR1 (MFR of A-2) | 0.3 |

TABLE 1-continued

|  | Component (A) |
|---|---|
| Total $C_2$ [wt.-%] (loop + GPR1) | 4.1 |
| $C_2$ in GPR1 [wt.-%] ($C_2$ of A-2) | 4.9 |
| XCS [wt.-%] | 4.7 |

The polymer powder was compounded in a co-rotating twin-screw extruder Copenion ZSK 57 at 220° C. with 0.2 wt-% antiblock agent (synthetic silica; CAS-no. 7631-86-9); 0.1 wt.-% antioxidant (Irgafos 168FF); 0.1 wt.-% of a sterical hindered phenol (Irganox 1010FF); 0.02 wt.-% of Ca-stearat) and 0.02 wt-% of a non-lubricating stearate (Synthetic hydrotalcite; CAS-no. 11097-59-9).

TABLE 2

| polymer properties | | |
|---|---|---|
| Pellet | | Component (A) |
| XCS [wt.-%] | | 4.7 |
| Total $C_2$ [wt.-%] | | 4.1 |
| $MFR_2$ [g/10 min] | | 1.1 |
| Tm [° C.] | | 125 |
| Tc [° C.] | | 85 |

For Inventive Examples IE1 and IE2 the $C_2C_3$ random copolymer (A) produced as described above was mixed with an ethylene based plastomer (B).

The following commercially available plastomer (B) has been used:

Queo™ 8201, ethylene-octene plastomer, density 882 kg/n³, $MFR_2$ (190° C., 2.16 kg) 1.1 g/10 min and melting point 76° C., commercially available from *Borealis* AG Mixing was done in a co-rotating twin-screw extruder Coperion ZSK 57.

Film Production

All film properties were determined on monolayer blown films of 50 μm thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 μm, with a 2.5 blow-up ratio and an output rate of about 8 kilograms per hour (kg/h). Properties of the films can be seen in Table 3.

TABLE 3

|  |  | CE1 | IE1 | IE2 |
|---|---|---|---|---|
| $C_2C_3$ copolymer | wt.-% | 100 | 90 | 75 |
| Queo 8201 | wt.-% |  | 10 | 25 |
| 50 μm BF |  |  |  |  |
| Tensile Modulus MD | MPa | 638 | 527 | 341 |
| Tensile Modulus TD | MPa | 664 | 540 | 319 |
| DDI | g | 43 | 116 | >1700 |
| Haze/b.s. | % | 4.9 | 3.9 | 2.6 |
| Clarity/b.s. | % | 91.8 | 91.8 | 90.7 |
| Haze/a.s. | % | 4.9 | 4.6 | 5.2 |
| Clarity/a.s. | % | 91.1 | 89.9 | 85.0 |
| Tear/MD | N/mm | 6.6 | 7.6 | 19.7 |
| Tear/TD | N/mm | 21.2 | 119.4 | 168.0 |
| SIT | ° C. | 109 | 105 | 90 |
| OMA |  | 859 | 1027 | 2584 | b.s. before steam sterilization
a.s. after steam sterilization

From the above table it can be clearly seen that the inventive blown films base on the specific blend, show an advantageous combination of low sealing initiation temperature (SIT), high tear resistance as wells as impact strength, and good optical properties, like low haze. Furthermore, such films have an improved overall performance, i.e. high OMA.

The invention claimed is:

1. A blown film comprising at least 95.0 wt. % of a blend of component (A) and (B), the blend comprising:
   (A) 60.0 wt. % to 95.0 wt.% of a $C_2C_3$ random copolymer consisting of:
   45.0 to 85.0 wt. % of polymer fraction (A1) having;
   (i) an ethylene content in the range of from 1.5 to 5.0 wt. % and
   (ii) a melt flow rate $MFR_2$ (230° C./2.16 kg) measured according to ISO 1133 in the range of from 0.8 to 8.0 g/10 min and 15.0 to 55.0 wt. % of polymer fraction (A-2) having;
   (i) an ethylene content in the range of from 4.0 to 10.0 wt. % and
   (ii) a melt flow rate $MFR_2$ (230° C./2.16 kg) measured according to ISO 1133 in the range of from 0.1 to 3.0 g/10 min,
   whereby the ethylene content of polymer fraction (A-2) is higher than the ethylene content of polymer fraction (A-1), and the melt flow rate $MFR_2$ (230° C./2.16 kg) of polymer fraction (A-2) is lower than the $MFR_2$ (230° C./2.16 kg) of polymer fraction (A-1), and whereby the $C_2C_3$ random copolymer has
   (a) a total ethylene content in the range of from 1.0 to 7.0 wt. %;
   (b) a melt flow rate $MFR_2$ (230° C./2.16 kg) measured according to ISO 1133 in the range of from 0.5 to less than 4.0 g/10 min and
   (c) a melting temperature Tm as determined by DSC according to ISO 11357 of from 110° C. to 140° C.,
   wherein said copolymer is prepared using a single site catalyst,
   (B) 5.0 wt. % to 40.0 wt. % of an ethylene based plastomer having
   (i) a density according to ISO 1183 of 860 kg/m³ to 900 kg/m³
   (ii) an $MFR_2$ according to ISO 1133 (190° C.; 2.16 kg) in the range of 0.1 to 50.0 g/10 min, and
   (iii) a comonomer selected from a $C_4$ to $C_8$ alpha-olefin, said blown film having
   a) a dart-drop impact strength (DDI) determined according to ASTM D1709, method A on a 50 μm blown film of at least 60 g up to more than 1700 g and
   b) an Elmendorf tear strength determined in accordance with ISO 6383/2 measured in machine direction (MD), in the range from at least 5.0 N/mm up to 50.0 N/mm and measured in transverse direction (TD) in the range of from at least 80.0 N/mm up to 300.0 N/mm.

2. The blown film according to claim 1, wherein the $C_2C_3$ random copolymer (A) has a xylene cold soluble (XCS) fraction measured according to ISO 16152 at 25° C. in the range of from 0.6 to 12.0 wt. %.

3. The blown film according to claim 1, wherein the $C_2C_3$ random copolymer (A) has:
   (a) a total ethylene content in the range of from 1.5 to 6.5 wt. %,
   (b) a melt flow rate $MFR_2$ (230° C./2.16 kg) measured according to ISO 1133 in the range of from 0.7 to 3.5 g/10 min, and
   (c) a melting temperature Tm as determined by DSC according to ISO 11357 of from 115° C. to 135° C.

4. The blown film according to claim 1, wherein the ethylene based plastomer (B) has:
   (i) a density according to ISO 1183 of 865 kg/m³ to 895 kg/m³,
   (ii) an $MFR_2$ according to ISO 1133 (190° C.; 2.16 kg) in the range of 0.3 to 20.0 g/10 min, and
   (iii) a comonomer selected from 1 butene or 1 octene.

5. The blown film according to claim 1, wherein the film comprises at least 95.0 wt. % of a blend comprising 65.0 to 93.0 wt. % of the $C_2C_3$ random copolymer (A) and 7.0 to 35.0 wt. % of the ethylene based plastomer (B).

6. The blown film according to claim 1, wherein the film comprises at least 98.0 wt. % of the blend of Component (A) and Component (B).

7. The blown film according to claim 1, wherein the film has a dart-drop impact strength (DDI) determined according to ASTM D1709, method A on a 50 µm blown film in the range of 80 g up to more than 1700 g.

8. The blown film according to claim 1, wherein the film has an Elmendorf tear strength as determined in accordance with ISO 6383/2 as measured in machine direction (MD), in the range of 7.0 up to 45.0 N/mm, and as measured in transverse direction (TD), in the range of 90.0 to 250.0 N/mm.

9. The blown film according to claim 1, wherein the film has a tensile modulus determined according to ISO 527 at 23° C. on blown films with a thickness of 50 µm in machine direction as well as in transverse direction in the range of from 200 to less than 800 MPa.

10. The blown film according to claim 1, wherein the film has a sealing initiation temperature (SIT) (determined as described in the experimental part) in the range of from 80° C. to below 115° C.

11. The blown film according to claim 1, wherein the film has;
   a haze (determined according to ASTM D1003-00 on a blown film with a thickness of 50 µm) in the range of from 0.5 to below 5.0%, and
   a clarity (determined according to ASTM D1003-00 on a blown film with a thickness of 50 µm) of at least 80.0% up to 100.0%.

12. The blown film according to claim 1, wherein the film has a haze value (determined according to ASTM D 1003-00 on a 50 µm blown film) after steam sterilization at 121° C. for 30 min in the range of 1.0 to below 10.0%, and a clarity (determined according to ASTM D1003-00 on blown films with a thickness of 50 µm) after sterilization (steam sterilization at 121° C. for 30 min) of at least 70.0%.

13. The blown film according to claim 1, wherein the film has an optomechanical ability (OMA) according the formula:

$$OMA = \frac{\text{Tensile Modulus}(MD)[\text{MPa}] * \text{Tear}(MD)[\text{N/mm}]}{\text{Haze}(50 \ \mu m)[\%]}$$

determined on a 50 µm blown film of at least 900 [MPa*N/mm*%] up to 4000 [MPa*N/mm*%].

14. The blown film according to claim 1, wherein the film is a monolayer film.

* * * * *